(12) United States Patent
Savic et al.

(10) Patent No.: US 11,986,366 B2
(45) Date of Patent: May 21, 2024

(54) DIGITAL CORRECTION FACTORS AND MOUNTING WITH DIGITAL CORRECTION FACTORS OF REAL PREFABRICATED PROSTHETIC TEETH

(71) Applicant: KULZER GMBH, Hanau (DE)

(72) Inventors: Novica Savic, Erlensee (DE); Karl-Heinz Renz, Alzenau (DE); Silke Maren Gall, Alzenau (DE); Stefan Rombeck, Uhldingen-Mühlhofen (DE)

(73) Assignee: KULZER GMBH, Hanau (DE)

( * ) Notice: Subject to any disclaimer, the term of this patent is extended or adjusted under 35 U.S.C. 154(b) by 635 days.

(21) Appl. No.: 16/491,621

(22) PCT Filed: Mar. 8, 2018

(86) PCT No.: PCT/EP2018/055804
§ 371 (c)(1),
(2) Date: Sep. 6, 2019

(87) PCT Pub. No.: WO2018/162657
PCT Pub. Date: Sep. 13, 2018

(65) Prior Publication Data
US 2020/0008911 A1    Jan. 9, 2020

(30) Foreign Application Priority Data
Mar. 9, 2017    (DE) ................. 10 2017 105 044.2

(51) Int. Cl.
*A61C 13/10*    (2006.01)
*A61C 9/00*    (2006.01)
*A61C 13/00*    (2006.01)

(52) U.S. Cl.
CPC ........ *A61C 13/1003* (2013.01); *A61C 9/0053* (2013.01); *A61C 13/0004* (2013.01); *A61C 13/0006* (2013.01)

(58) Field of Classification Search
CPC ............ A61C 13/1003; A61C 13/0006; A61C 13/0004; A61C 9/0053
See application file for complete search history.

(56) References Cited

U.S. PATENT DOCUMENTS 5,343,391 A  * 8/1994 Mushabac ............ A61C 9/0046
                                                433/79
8,401,690 B2    3/2013 Gleditzsch et al.
(Continued)

FOREIGN PATENT DOCUMENTS

DE    10 2006 061 134 A1    6/2008
DE    10 2012 221 793 A1    5/2014
(Continued)

OTHER PUBLICATIONS

International Search Report and Written Opinion dated Jul. 18, 2018, in connection with PCT International Application No. PCT/EP2018/055804.
(Continued)

*Primary Examiner* — Nicholas D Lucchesi
(74) *Attorney, Agent, or Firm* — Norris McLaughlin, P.A.

(57) ABSTRACT

The invention relates to correction factors, in particular digital correction factors or printed correction factors, as translation (x,y,z) data and/or as data of the rotation of at least one real prefabricated prosthetic tooth up to a plurality of real prefabricated prosthetic teeth in a mounting for material-ablating processing of the prosthetic teeth, the correction factors preferably being assigned to the mounting as bar code or as quick-response code for use in a digitally controlled material-ablating process, the mounting having at least one fixed real prefabricated tooth. The invention also relates to the mounting with assigned digital correction (Continued)

Figure 1:
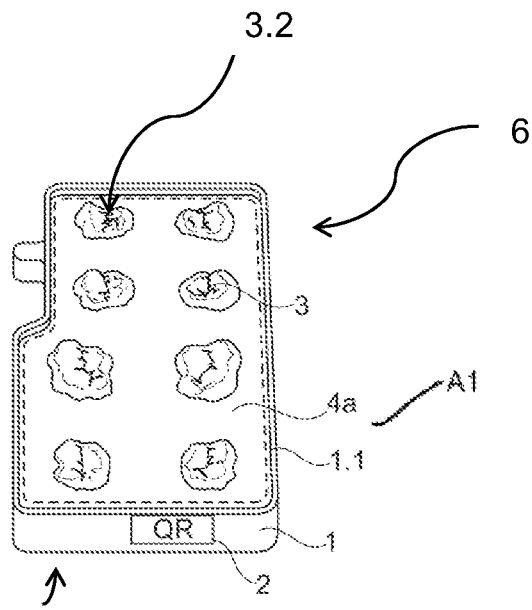

factors as well as to a method for determining the digital correction factors of the at least one real prefabricated prosthetic tooth.

11 Claims, 2 Drawing Sheets

(56) References Cited

U.S. PATENT DOCUMENTS

| | | | |
|---|---|---|---|
| 9,295,534 B2* | 3/2016 | Ruppert | B33Y 80/00 |
| 10,011,050 B2* | 7/2018 | Kitching | A61C 7/002 |
| 10,390,914 B2* | 8/2019 | Savic | A61C 13/12 |
| 10,537,412 B2* | 1/2020 | Woldegergis | A61C 13/0004 |
| 11,123,156 B2* | 9/2021 | Cam | A61C 7/08 |
| 11,219,511 B2* | 1/2022 | Berckmans, III | A61C 13/0019 |
| 2003/0002089 A1* | 1/2003 | Vadnais | A61C 13/0004 |
| | | | 358/474 |
| 2003/0068079 A1* | 4/2003 | Park | A61C 13/0004 |
| | | | 382/154 |
| 2005/0276672 A1 | 12/2005 | Prince et al. | |
| 2008/0154743 A1 | 6/2008 | Holzner et al. | |
| 2009/0023112 A1* | 1/2009 | Ganley | A61C 13/0022 |
| | | | 409/117 |
| 2009/0319068 A1* | 12/2009 | Sager | A61C 13/0004 |
| | | | 706/14 |
| 2010/0000677 A1* | 1/2010 | Guggenmos | A61C 13/0022 |
| | | | 156/578 |
| 2010/0106275 A1* | 4/2010 | Andersson | A61C 9/0006 |
| | | | 700/118 |
| 2011/0196524 A1* | 8/2011 | Giasson | B33Y 50/00 |
| | | | 700/118 |
| 2015/0037756 A1 | 2/2015 | Berckmans, III et al. | |
| 2016/0291585 A1 | 10/2016 | Leeson et al. | |
| 2018/0110599 A1 | 4/2018 | Woldegergis | |
| 2018/0146934 A1* | 5/2018 | Ripoche | G06T 17/20 |
| 2019/0130596 A1* | 5/2019 | Manafighazani | G06Q 10/087 |
| 2020/0051234 A1* | 2/2020 | Ajri | G06T 7/0014 |

FOREIGN PATENT DOCUMENTS

| | | |
|---|---|---|
| WO | 99/47065 A1 | 9/1999 |
| WO | 2008/097874 A2 | 8/2008 |
| WO | 2016/169921 A1 | 10/2016 |
| WO | 2018/162657 A1 | 9/2018 |

OTHER PUBLICATIONS

English translation of International Search Report dated Jul. 18, 2018, in connection with PCT International Application No. PCT/EP2018/055804.

Third Page of Office Action issued in connection with German Patent Application No. 10 2017 105 044.2.

* cited by examiner

DIGITAL CORRECTION FACTORS AND MOUNTING WITH DIGITAL CORRECTION FACTORS OF REAL PREFABRICATED PROSTHETIC TEETH

This application is a 371 of International Patent Application No. PCT/EP2018/055804, filed Mar. 8, 2018, which claims foreign priority benefit under 35 U.S.C. § 119 of the German Patent Application No. 10 2017 105 044.2, filed Mar. 9, 2017, the disclosures of which are incorporated herein by reference.

The invention relates to correction factors, in particular digital correction factors or printed correction factors, as translation (x,y,z) data and/or as data of the rotation of the tooth axis of at least one real prefabricated prosthetic tooth up to a plurality of real prefabricated prosthetic teeth in a mounting for material-ablating processing of the prosthetic teeth, the correction factors preferably being assigned to the mounting as bar code or as quick-response code for use in a digitally controlled material-ablating process, the mounting having at least one fixed real prefabricated tooth up to a plurality of prosthetic teeth. The invention also relates to the mounting with assigned digital correction factors as well as to a method for determining the digital correction factors of the at least one real prefabricated prosthetic tooth.

CIM processes (Computer-Integrated Manufacturing), such as CAD/CAM processes, are becoming increasingly important in dental prosthetics. Thus, it has become common practice in dental prosthetics to digitize the gingival and residual tooth situation in the patient's mouth and to design and manufacture dental prostheses using CAD/CAM. A plaster model or the gingival and residual tooth situation in the patient's mouth is scanned for digitizing arrangement and orientation of the teeth and prefabricated prosthetic teeth.

It has become common practice to use the digital data of prefabricated prosthetic teeth for an individualized tooth set-up of a prosthetic restoration with denture base for the real set-up of the prosthetic teeth.

For this purpose, the real prefabricated prosthetic teeth may be provided in a mounting. Usually, the buyer receives a generic digital data set of mountings and virtual prefabricated prosthetic teeth. One problem in this regard is that, due to the manufacturing process, the mounting and the real prefabricated prosthetic teeth, in particular in the mounting, do not exactly have orientation and/or arrangement according to the generic digital data.

There are already first methods to digitally set-up and produce the partial or total prosthetics using CAD procedures. In current procedures, the corrections required to adapt the data to the deviation of the virtual and real arrangement must currently be made manually. Thus, for example, deviations of the tooth blanks have to be manually added in the software by the user.

Currently, it is therefore common practice for the user to manually correct the parameters in the software by adapting the digital data in case of detecting deviations in orientation and/or arrangement of the real prosthetic teeth in the mounting. For this purpose, the user manually subjectively determines the deviation of the real prosthetic teeth from the virtual prosthetic teeth so that adaptation of the real prosthetic teeth is subject to another source of error. The removable prostheses produced in this way with prefabricated teeth therefore do not have a perfect fit.

It was the object of the invention to provide a possibility to reproducibly enable deviations due to the manufacturing process or due to other reasons in arrangement and/or orientation of real prefabricated teeth in a mounting for material-ablating processing. Preferably, the deviations shall be provided in digital form. Furthermore, information of the deviations shall be easily accessible for the user for material-ablating processing. Therefore, another object was to further automate customers processing and to shorten the processing times of the prosthetic teeth.

The objects according to the invention are solved by the subject-matters disclosed herein and further described throughout this disclosure. Thus, according to the invention, correction factors or a mounting with correction factors which contain information on the deviation in the arrangement and/or orientation of the real prosthetic teeth are made available to the processor.

Thus, a subject matter of the invention is the provision of correction factors which are assigned, for example as a bar code or QR code, to the real prosthetic teeth or the mounting of the prosthetic teeth. These correction factors may already be determined by the producer of, for example, the blanks, frames, etc. and may be printed, lasered, etc. by means of a bar code or QR code.

These correction factors supplied by the producer then only need to be scanned on site by the user and read into the CAM machine or software so that the software may automatically make the correct adjustment and the final result is improved in terms of accuracy of fit. A reduction of material usage due to the elimination of e.g. duplication of work in case of fitting problems as well as a considerable time saving on the part of the user are further advantages of the invention.

A prefabricated prosthetic tooth, in particular a real prefabricated prosthetic tooth, is understood to mean a prosthetic tooth which may be reproducibly produced in an industrial process and which is preferably grinded from basal and/or on the occlusal surface for individual adaptation to the wearer only. A prefabricated prosthetic tooth may be selected from a library of prefabricated prosthetic teeth. Usually, the geometry of the prefabricated prosthetic tooth corresponds to that of a virtual prefabricated prosthetic tooth being in a digital data set. A prefabricated prosthetic tooth may be individually adapted in length from basal and/or occlusal, in particular to the future wearer. The prefabricated prosthetic tooth may comprise a dental polymerized polymer mixture optionally containing inorganic fillers and/or dental glasses. Preferably, the prefabricated prosthetic tooth has an occlusal surface. The prefabricated prosthetic tooth preferably is basally solid and/or cervically has no cavities. A prefabricated prosthetic tooth is not a crown. A prefabricated denture tooth is not a sintered blank so that no shrinkage must be taken into account when using it in the production of dental products.

A subject matter of the invention is a mounting for use in a digitally controlled material-ablating process, in particular a CAM process, containing at least one fixed real prefabricated prosthetic tooth, wherein
  (i) the mounting has a plane in which at least one flat three-dimensional moulded body is arranged, in particular at least two moulded bodies, in order to be able to fix the prosthetic teeth between the individual moulded bodies, or
  (ii) the mounting has a plane in which at least two clamping elements are arranged, wherein at least one real prefabricated prosthetic tooth is fixed in the moulded body or between the clamping elements,
  wherein the tooth axis of the at least one prefabricated prosthetic tooth, in particular the respective tooth axis of the at least two to 32 prosthetic teeth, are arranged at an angle of 20° to 160° to the plane of the mounting, and the at least one real prefabricated prosthetic tooth may be processed from coronal and/or from apical in an ablating process, and correction factors, in particular digital correction factors, are assigned to the mounting for spatial, real arrangement, in particular comprising the orientation, of the at least one real prefabricated prosthetic tooth in relation to a reference arrangement comprising at least one corresponding real prefabricated reference prosthetic tooth A3 in a reference mounting A1 of the mounting or at least one virtual prefabricated reference prosthetic tooth vA3, optionally in a virtual reference mounting vA1 of the mounting.

In this context, the correction factors, in particular the digital correction factors, preferably form translation (x,y,z) data and optionally rotation data of the respective outer shape of the respective real prefabricated prosthetic tooth in the ACTUAL arrangement to the TARGET arrangement, i.e. the reference arrangement. Thus, the correction factors are information, in particular digital information, on the deviation in the spatial ACTUAL arrangement in the form of translation (x,y,z) data and/or rotation data of the outer surface of the respective at least one real prefabricated prosthetic tooth in relation to the reference arrangement. If reference is made to the rotation, the data of the rotation of the outer surface of the respective at least one real prefabricated prosthetic tooth shall be taken into account.

The tooth axis is defined as the central axis of a circular cylinder which encloses the tooth in such a way that the base surfaces of the circular cylinder are oriented coronally and apically.

In this context, it is preferred for the correction factors (i) to be stored as digital correction factors in the form of a bar code or quick-response code or (ii) to be graphically reproduced as scannable correction factors. Particularly preferably, the correction factors are assigned to the mounting or are arranged on the mounting as bar code or as quick-response code (QR code), the correction factors may preferably be printed onto the mounting as bar code or QR code. In further alternatives, it is also considered to be assigned to the holder if the correction factors are printed onto the at least one real prosthetic tooth, the packaging, a packaging part or the secondary packaging or are attached as a file.

The at least one or at least two real prefabricated prosthetic teeth may also comprise arrangements of a number of real integral prefabricated prosthetic teeth in the form of a bridge.

Moreover, a subject matter of the invention is a mounting comprising correction factors as digital data, in particular as information, on deviation in the spatial ACTUAL arrangement in the form of translation (x,y,z) data and/or rotation data of the at least one real prefabricated prosthetic tooth, in particular the rotation of the respective outer shape of at least one real prosthetic teeth, in relation to a reference arrangement, in particular the reference arrangement is a TARGET arrangement, of at least one corresponding real prefabricated reference prosthetic tooth in a real reference mounting A1 and/or of at least one virtual prefabricated reference prosthetic tooth vA3, optionally in a virtual reference mounting vA1.

A preferred mounting has correction factors with information on deviation in the spatial arrangement in the form of translation (x,y,z) data and/or rotation of the at least two real prosthetic teeth up to 32 prosthetic teeth, in particular two to 16 prosthetic teeth, in relation to a reference arrangement of corresponding real reference prosthetic teeth A3 in a real reference mounting A1 and/or of corresponding virtual reference prosthetic teeth vA3, optionally in a virtual reference mounting vA1.

Another subject matter of the invention is a mounting comprising at least one moulded body, in particular at least two moulded bodies between which at least two real prefabricated prosthetic teeth are fixed, or a mounting having clamping elements between which at least two real prefabricated prosthetic teeth are fixed. In this context, the respective tooth axis of the prosthetic teeth, in particular of the two to 32 prosthetic teeth, is arranged at an angle of 20° to 160° to the plane of the mounting so that the at least two real prefabricated prosthetic teeth may be processed from coronal and/or from apical in an material-ablating process, and wherein correction factors are assigned to the mounting for spatial arrangement of the at least two real prosthetic teeth in relation to a reference arrangement of the corresponding real prefabricated reference prosthetic teeth A3 in a reference mounting A1 or of corresponding virtual prefabricated reference prosthetic tooth vA3, optionally in a virtual reference mounting vA1. A material-ablating process is understood to mean milling, cutting, chipping, polishing and/or grinding processing of the material.

A preferred mounting has correction factors as information, in particular as digital data having information, on deviation in the spatial arrangement in the form of translation (x,y,z) data or these x,y,z data and/or rotation data of the respective outer shape of all the real prefabricated prosthetic teeth arranged in the mounting,
  (i) in relation to the information in a data set having data on the external shape of corresponding prosthetic teeth in a real reference mounting A1, and/or
  (ii) in relation to the information in a further data set having data on the outer shape of the corresponding virtual prefabricated reference prosthetic teeth vA3, optionally in a virtual reference mounting vA1.

A mounting having one or at least two real prosthetic teeth fixed in the material of the moulded body such that the tooth axis of the one or the at least two prosthetic teeth is arranged at an angle of 20° to 160° to the plane of the mounting is likewise preferred. Fixation in the holder may be achieved, for example, by overmoulding the one real prosthetic tooth or the at least two real prosthetic teeth by the material of the moulded body or by embedding the one or the at least two real denture teeth in the material of the moulded body, or by casting the material of the moulded body around the one or the at least two real prosthetic teeth.

Preferably, a) wax, plastic or a hybrid material may be selected as material of the at least one flat three-dimensional moulded body. An organic polymeric material, advantageously comprising inorganic filler, is preferred. Alternatively, the b) at least two clamping elements may enclose, at least area by area, the at least one real prefabricated prosthetic tooth or the at least two real prefabricated prosthetic teeth in the area of their respective central outer periphery, wherein the clamping elements preferably have recesses, and the inner surfaces of which fit, at least area by area, in a form-fitting manner to areas in the area of the central outer periphery of the prosthetic teeth.

Another subject matter of the invention is a method for determining the correction factors of the spatial arrangement of the at least one real prefabricated prosthetic tooth, in particular of the at least two real prosthetic teeth, in a mounting in relation to a reference arrangement of at least one corresponding real prefabricated reference prosthetic tooth A3 in a real reference mounting A1 or of at least one virtual prefabricated reference prosthetic tooth vA3, optionally in a virtual reference mounting vA1, in which the mounting with the plane in which at least one flat three-dimensional moulded body is arranged, and wherein at least one real prefabricated prosthetic tooth is fixed in the moulded body, the tooth axis of which tooth is arranged at an angle of 20° to 160° to the plane of the mounting, or the mounting with the plane in which at least two clamping elements are arranged such that at least one real prefabricated prosthetic tooth is fixed between the clamping elements, the tooth axis of which is arranged at an angle of 20° to 160° to the plane of the mounting, the three-dimensional information on arrangement of the outer shape, in particular information on translation (x,y,z) data and/or rotation data of the respective outer shape, of the at least one real prefabricated prosthetic tooth in the mounting is digitally, in particular three-dimensionally, captured by means of a scanner, and digital information on spatial, real arrangement is obtained, digital information on real arrangement is compared with digital data having information on spatial arrangement of the reference arrangement of at least one corresponding real prefabricated reference prosthesis tooth A3 in a real reference mounting of the mounting or of the at least one virtual prefabricated reference prosthesis tooth, optionally in a virtual reference mounting of the mounting, digital correction factors are determined in relation to the data of the reference arrangement, and the correction factors are determined. The correction factors thus obtained are preferably present as digital correction factors, stored in the form of a bar code or a quick-response code or as scannable correction factors, graphically reproduced correction factors.

According to a preferred embodiment of the method, the correction factors, in particular the digital correction factors, are assigned to the mounting or are arranged on the mounting as barcode or as quick-response code (QR code), in particular the correction factors are printed onto the mounting.

Moreover, a subject matter of the invention is the use of correction factors or of digital correction factors for coronal and/or apical processing, in particular for material-ablating processing, such as a milling, grinding, polishing, drilling, cutting, scraping, of the at least one real prefabricated prosthetic tooth in the mounting for use in a material-ablating process, wherein a connection geometry for fastening the mounting to a CAM machine is assigned to the mounting.

Preferred is the use of digital correction factors comprising information on deviation in the spatial ACTUAL arrangement in the form of translation (x,y,z) data, or these x,y,z coordinates and/or rotation data of the respective outer shape of the respective at least one real prefabricated prosthetic tooth in relation to a reference arrangement, i.e. the TARGET arrangement, of at least one corresponding real prefabricated reference prosthetic tooth A3 in a real reference mounting A1 and/or of at least one virtual prefabricated reference prosthetic tooth vA3, optionally in a virtual reference mounting vA1, wherein the digital correction factors are read into a digital data processing apparatus, and (i) provided digital translation (x,y,z) data and/or digital rotation data of the outer shape of the at least one virtual or real prefabricated prosthetic tooth in relation to the reference arrangement, i.e. the spatial TARGET arrangement in the form of translation (x,y,z) data and (or rotational data of the outer shape of the at least one prefabricated prosthetic tooth, (ii) are corrected for the translation (x,y,z) data and/or rotation data of the outer shape of the at least one real prefabricated prosthetic tooth in the mounting, and (iii) obtaining an individualized data set of the mounting containing at least one fixed real prefabricated prosthetic tooth.

Likewise a subject matter of the invention is the use of an individualized data set, in particular obtained in consideration of digital correction factors based on the spatial arrangement of the at least one real prefabricated prosthetic tooth in the mounting, comprising the digital translation (x,y,z) data and/or the digital rotation data of the at least one virtual or real prefabricated prosthetic tooth for ablative processing of the at least one real prefabricated prosthetic tooth in the mounting, in particular in the same mounting, having a connection geometry for fastening the mounting to a CAM machine.

Another subject matter of the invention are digital correction factors of the spatial arrangement of the at least one real prefabricated prosthetic tooth in the mounting in relation to a reference arrangement of at least one corresponding real prefabricated reference prosthetic tooth A3 in a reference mounting A1 of the mounting or of at least one virtual prefabricated reference prosthetic tooth vA3, optionally in a virtual reference mounting vA1 of the mounting, in particular for coronal and/or apical processing of the prosthetic tooth. Preferably for material-ablating processing, such as milling, grinding, polishing, drilling, cutting, scraping, of at least one real prefabricated prosthetic tooth, in particular in the mounting for use in a material-ablating process, wherein a connection geometry for fastening the mounting to a CAM machine is assigned to the mounting.

Preferably, the correction factors (i) are stored as digital correction factors in the form of a bar code or quick-response code or (ii) are graphically reproduced as scannable correction factors. The correction factors are preferably arranged on the mounting, the packaging, a part of the packaging or the outer packaging as bar code or as quick-response code (QR code). In this context, the correction factors comprise digital data or information on the deviation in the spatial ACTUAL arrangement in the form of translation (x,y,z) data and/or rotation data of the outer shape of the at least one real prefabricated prosthetic tooth in relation to a reference arrangement (TARGET arrangement) of the at least one corresponding real prefabricated reference prosthetic tooth A3 in a reference mounting A1 and/or of the at least one virtual prefabricated reference prosthetic tooth vA3, optionally in a virtual reference mounting vA1.

Moreover, a subject matter of the invention is a method for determining the digital data having information on translation (x,y,z) data or x,y,z coordinates and the rotation data of the respective outer shape of the at least one real prosthetic tooth of the reference arrangement by three-dimensionally capturing the outer shape of the at least one corresponding real prefabricated reference prosthetic tooth (A3) in a real reference mounting A1 as reference arrangement. Preferably, the at least one real prefabricated prosthetic tooth (3) is fixed in the mounting, and the respective tooth axis is arranged at an angle of 20° to 160° to the plane of the mounting.

In this context, the reference arrangement is three-dimensionally captured by means of a scanner and three-dimensional information on arrangement of the outer shape, in particular as translation (x,y,z) data and/or rotation data, of the at least one real prefabricated prosthetic tooth in the mounting are digitally captured, and digital data having information on the spatial arrangement of the reference arrangement are obtained.

Likewise a subject matter of the invention is the use of the digital data having information on the spatial arrangement of the reference arrangement for determining correction factors or digital correction factors for coronal and/or apical processing, in particular for material-ablating processing, of the at least one real prefabricated prosthetic tooth in the mounting for use in a material-ablating process, wherein a connection geometry for fastening the mounting to a CAM machine is assigned to the mounting.

The material of the moulded body, of the moulded bodies or of the clamping jaws may be selected from a polymeric material, filled polymeric material, a fiber-reinforced polymer, hybrid material, wherein the polymeric material may be selected from fluoropolymers, polysulfide-containing polymers, Polysulfone-containing polymers, polyaryl ether ketones, polyimides, PAEK (polyarylether ketones), PEEK (polyether ether ketones), PEK (polyether ketones), PEKK (polyether ketone ketones), PEEEK (polyether ether ether ketones), PEEKK (polyether ether ketone ketones), PEKEKK (polyether ketone ether ketone ketones), PES (polyether sulfones), PPSU (polyphenylene sulfones), polyaryl sulfones PSU (polysulfones), PPS (polyphenylene sulfides), PFA (perfluoroalkoxy polymers), PFE (poly(fluorenylene ethynylene) polymers), PVDF (polyvinylidene fluoride), PTFE (polytetrafluoroethylene), PAI (polyamide imides), PI (polyimides), PEI (polyetherimides), PBI (polybenzimidazoles).

The invention is explained in more detail using the figures without limiting the invention to these exemplary embodiments.

The figures show: FIG. 1: A mounting 1 with real arrangement 6 having a plane 1.1 in which a flat three-dimensional moulded body 4a is arranged in which 8 real prefabricated prosthetic teeth 3 are fixed. The correction factors 2 are printed on the mounting 1 in the form of a QR code.

Figure 2A:
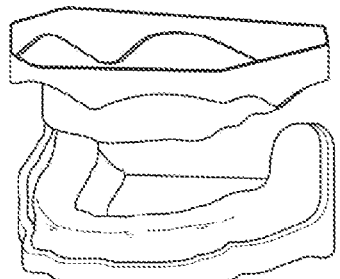
Figure 2B:
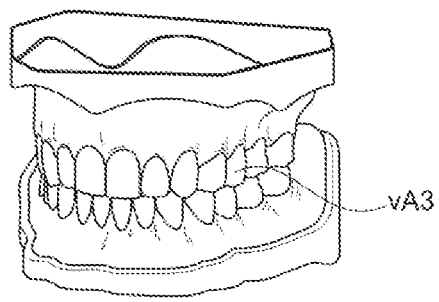
Figure 3A:
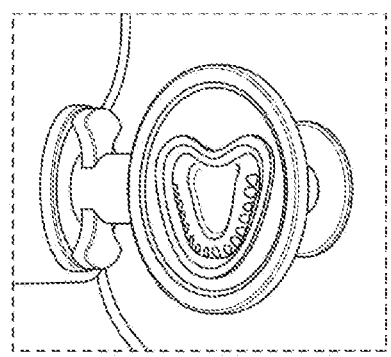
Figure 3B:
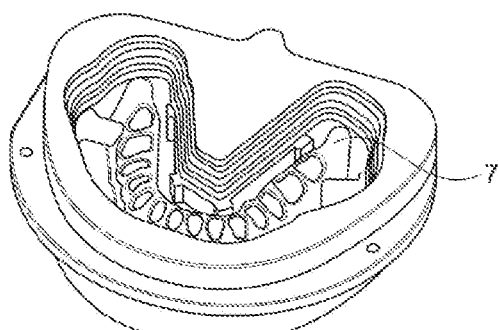
Figure 4:
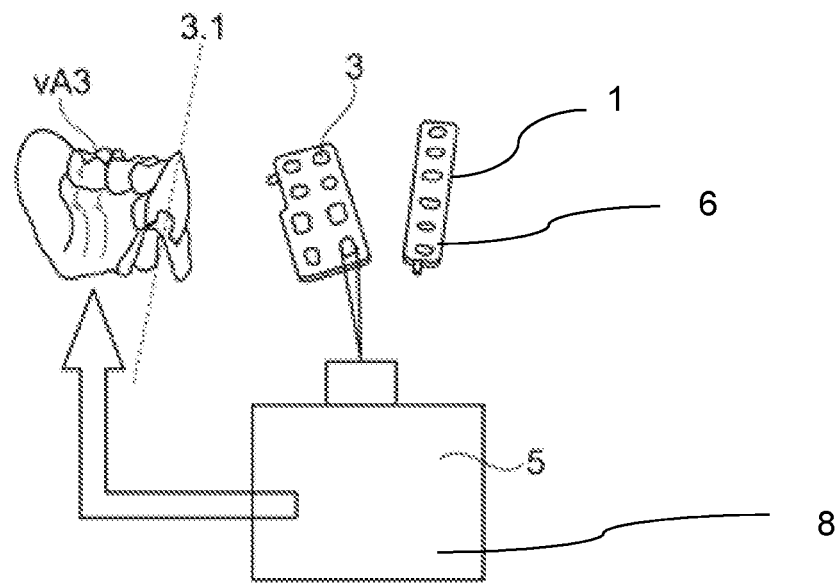

FIGS. 2a and 2b show a virtual model of an edentulous jaw for simulation of the occlusion of virtual prefabricated reference prosthetic teeth vA3 in a virtual denture base. FIGS. 3a and 3b show the production of a real denture base 7 in a CAM process from the digital data of the virtual denture base, to which the real prefabricated reference prosthetic teeth A3 and optionally processed prosthetic teeth A3 are later attached. FIG. 4 schematically shows scanning of the mounting 1 with a scanner 5 for digital capture of the three-dimensional information of the arrangement of the outer shape of the eight or five real prefabricated prosthetic teeth 3 in the mounting 1. In this context, digital information of the spatial real arrangement 6 of the real prosthetic teeth 3 is obtained. Subsequently, the digital information of the real arrangement 6 is compared with the digital data with information of the spatial arrangement of the reference arrangement (method step and reference arrangement were not separately shown) of at least one corresponding real prefabricated reference prosthetic tooth A3 in a real reference mounting A1 of the mounting 1 or of the at least one virtual prefabricated reference prosthetic tooth vA3 with tooth axis 3.1, optionally in a virtual reference mounting vA1 of the mounting 1 (process step not shown), and the digital correction factors 2 are determined in relation to the data of the reference arrangement. In so doing, the correction factors may be determined. The digital data of the prefabricated teeth to be adapted to the respective patient may be adapted to the initial situation in the mounting using these correction factors such that, in so doing, automated processing of the prefabricated teeth may directly be carried out with the correct initial data set in a CAM process. In methods according to the state of the art, the initial situation either had to be manually determined with the user previously or the prefabricated teeth were processed on the basis of the reference arrangement such that any deviation from the reference arrangement was not yet taken into account. Accuracy of fit of the prosthetic restoration and occlusion of the teeth are not guaranteed without taking the deviation into account.

Figure 5:
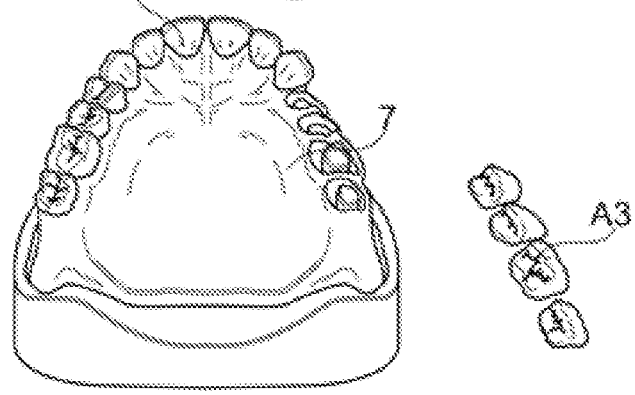
Figure 6:
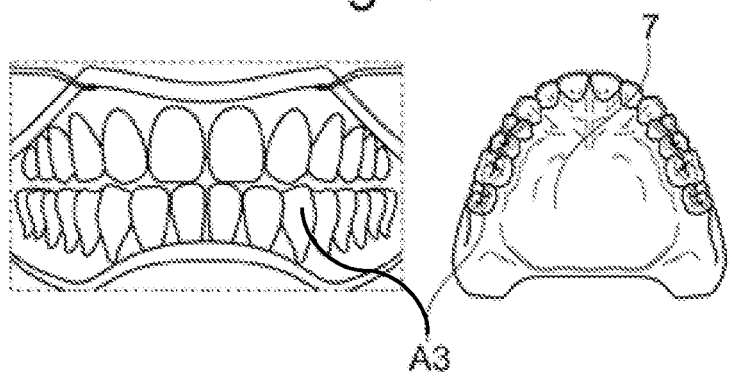

FIG. 5 shows a denture base 7 with inserted prefabricated prosthetic teeth A3 processed with the correction factors according to the invention for try-in with the patient. FIG. 6 shows corresponding finished denture bases 7 with prefabricated teeth outside and in the patient's mouth.

REFERENCE SIGNS

A1 real reference mounting of the mounting 1 with real prefabricated prosthetic teeth
A3 real prefabricated reference prosthetic tooth
vA1 virtual reference mounting of the mounting 1 of virtual prefabricated prosthetic teeth (not shown)
vA3 virtual prefabricated reference prosthetic teeth
1 Mounting, 1.1 plane of the mounting (1)
2 correction factor for the spatial, real arrangement (6) of the at least one real prefabricated prosthetic tooth (3) in relation to a reference arrangement, in particular digital correction factors as information, in particular digital data having information
3 real prefabricated prosthetic tooth, vA3 virtual prefabricated reference prosthetic tooth,
3.1 tooth axis
3.2 coronal
3.3 apical
4a three-dimensional, flat moulded body
4b clamping elements (not shown)
5 scanner
6 real arrangement
7 denture base
8 individualised data set

The invention claimed is:

1. A mounting (1) for use in a digitally controlled material-ablating process, containing at least one fixed real prefabricated prosthetic tooth (3),
wherein
the mounting (1) has a plane (1.1) in which at least one flat three-dimensional moulded body (4a) is arranged, or the mounting (1) has a plane (1.1) in which at least two clamping elements (4b) are arranged, the at least one real prefabricated prosthetic tooth (3) being fixed in the moulded body (4a) or between the clamping elements (4b),
a tooth axis (3.1) of the at least one real prefabricated prosthetic tooth being arranged at an angle of 20° to 160° to the plane (1.1) of the mounting (1), so that the at least one real prefabricated prosthetic tooth (3) is processible from coronal (3.2) direction and/or from apical (3.3) direction in an ablating process,
digital or scannable correction factors (2) being assigned to the mounting (1) for spatial, real arrangement (6) of the at least one prefabricated prosthetic tooth (3) in relation to a reference arrangement comprising at least one corresponding real prefabricated reference prosthetic tooth (A3) in a real reference mounting (A1) of the mounting (1) or at least one virtual prefabricated reference prosthetic tooth (vA3), and the digital or scannable correction factors (2) comprise information with respect to deviation in ACTUAL arrangement in the form of translation (x,y,z) data and optional rotation data of the respective real prefabricated prosthetic tooth in relation to the reference arrangement.

2. The mounting (1) according to claim 1, wherein the digital or scannable correction factors (2) (i) are stored as digital correction factors in the form of a bar code or quick-response code or (ii) are graphically reproduced as scannable correction factors.

3. The mounting (1) according to claim 2, wherein the digital or scannable correction factors (2) are assigned to the mounting (1) as bar code or as quick-response code (QR code).

4. The mounting (1) according to claim 1, wherein the information of the digital or scannable correction factors (2) further comprises digital data having information on deviation in spatial actual arrangement in the form of translation (x,y,z) data and/or rotation of at least one corresponding real prefabricated reference prosthetic tooth (A3) in a real reference mounting (A1) and/or of a virtual prefabricated reference prosthetic tooth (vA3).

5. The mounting (1) according to claim 1, wherein at least two real prefabricated prosthetic teeth (3) are fixed in the moulded body (4a) or between the clamping elements (4b), the respective teeth axis (3.1) of the at least two real prosthetic teeth being arranged at an angle of 20° to 160° to the plane (1.1) of the mounting (1), and the at least two real prefabricated prosthetic teeth (3) being processible from coronal (3.2) direction and/or from apical (3.3) direction in a material-ablating process, and the digital or scannable correction factors (2) being assigned to the mounting (1) for spatial, real arrangement of the at least two prefabricated prosthetic teeth (3) in relation to a reference arrangement of corresponding real prefabricated reference prosthetic teeth (A3) in a real reference mounting (A1) of the mounting (1) or of corresponding virtual prefabricated reference prosthetic tooth (vA3), in a virtual reference mounting (vA1).

6. The mounting (1) according to claim 1, wherein the information of the digital or scannable correction factors (2) further comprises information on deviation in the spatial arrangement in the form of translation (x,y,z) data and/or on rotation of the respective outer shape of all the real prefabricated prosthetic teeth arranged in the mounting, (i) in relation to the information in a data set having data on the outer shape of corresponding prosthetic teeth in a real reference mounting (A1), and/or (ii) in relation to the information in a further data set having data on the outer shape of corresponding virtual prefabricated reference prosthetic teeth (vA3).

7. The mounting (1) according to claim 1, wherein one or at least two real prosthetic teeth (3) are fixed in the material of the moulded body (4a) such that the tooth axis (3.1) of the one or the at least two prosthetic teeth is arranged at an angle of 20° to 160° to the plane (1.1) of the mounting (1).

8. The mounting (1) according to claim 1, wherein a) the material of the at least one flat three-dimensional moulded body (4a) is wax, plastic or a hybrid material, b) the at least two clamping elements (4b) enclose, at least area by area, the at least one real prefabricated prosthetic tooth (3) or at least two real prefabricated prosthetic teeth (3) in the area of their respective central outer periphery, the inner surfaces of which fit, at least area by area, in a form-fitting manner to areas in the area of the central outer periphery of prosthetic teeth.

9. The mounting (1) according to claim 8, wherein the at least two clamping elements (4b) have recesses.

10. The mounting (1) according to claim 1, wherein the at least one virtual prefabricated reference prosthetic tooth (vA3) is in a virtual reference mounting (vA1) of the mounting (1).

11. The mounting (1) according to claim 1, wherein the information with respect to the deviation in the ACTUAL arrangement of the respective real prefabricated prosthetic tooth in relation to the reference arrangement comprises the translation (x,y,z) data and the optional rotation data, and the optional rotation data accounts for rotation of the respective outer shape of the respective real prefabricated prosthetic tooth in relation to the reference arrangement.

* * * * *